(12) United States Patent
Kawada et al.

(10) Patent No.: US 10,908,355 B2
(45) Date of Patent: Feb. 2, 2021

(54) WAVE PLATE AND DIVIDED PRISM MEMBER

(71) Applicant: HAMAMATSU PHOTONICS K.K., Hamamatsu (JP)

(72) Inventors: Yoichi Kawada, Hamamatsu (JP); Takashi Yasuda, Hamamatsu (JP); Atsushi Nakanishi, Hamamatsu (JP)

(73) Assignee: HAMAMATSU PHOTONICS K.K., Hamamtsu (JP)

( * ) Notice: Subject to any disclaimer, the term of this patent is extended or adjusted under 35 U.S.C. 154(b) by 0 days.

(21) Appl. No.: 16/739,214

(22) Filed: Jan. 10, 2020

(65) Prior Publication Data

US 2020/0150339 A1 May 14, 2020

Related U.S. Application Data

(62) Division of application No. 14/906,924, filed as application No. PCT/JP2014/063383 on May 20, 2014, now Pat. No. 10,591,669.

(30) Foreign Application Priority Data

Jul. 30, 2013 (JP) .................. 2013-158037

(51) Int. Cl.
*G02B 6/10* (2006.01)
*H01Q 15/04* (2006.01)
*G02B 5/30* (2006.01)

(52) U.S. Cl.
CPC ........... *G02B 6/105* (2013.01); *G02B 5/3066* (2013.01); *G02B 5/3083* (2013.01); *H01Q 15/04* (2013.01)

(58) Field of Classification Search
CPC .... G02B 6/105; G02B 5/3066; G02B 5/3083; H01Q 15/04
See application file for complete search history.

(56) References Cited

U.S. PATENT DOCUMENTS 4,690,490 A * 9/1987 Mori ..................... F21S 11/00
385/147
4,975,712 A 12/1990 Chen
(Continued)

FOREIGN PATENT DOCUMENTS

EP 2273254 A1 1/2011
JP H05-347450 A 12/1993
(Continued)

OTHER PUBLICATIONS

International Preliminary Report on Patentability dated Feb. 11, 2016 for PCT/JP2014/063383.
(Continued)

*Primary Examiner* — Chris H Chu
(74) *Attorney, Agent, or Firm* — Faegre Drinker Biddle & Reath LLP (57) ABSTRACT

A wave plate comprising: a prism member having an entrance surface for receiving a terahertz wave T, and an exit surface for emitting the terahertz wave T received by the entrance surface; wherein the prism member is constituted by a plurality of waveguide regions having: a partial entrance surface for receiving a part of the terahertz wave T, a plurality of total reflection surfaces for totally reflecting the terahertz wave T from the partial entrance surface, and a partial exit surface for emitting the terahertz wave T totally reflected from the total reflection surfaces; and each of the partial entrance surfaces combine to constitute the entrance surface of the prism member, and each of the partial exit surfaces combine to constitute the exit surface of the prism member, by stacking waveguide regions.

2 Claims, 9 Drawing Sheets

(56) References Cited

U.S. PATENT DOCUMENTS

| | | | |
|---|---|---|---|
| 5,818,395 A | 10/1998 | Wolcott et al. | |
| 6,272,155 B1* | 8/2001 | Sekiguchi | G02B 6/06 372/6 |
| 6,356,679 B1* | 3/2002 | Kapany | G02B 6/29368 385/17 |
| 6,463,192 B1* | 10/2002 | Kapany | G02B 6/35 385/17 |
| 6,519,382 B1* | 2/2003 | Jurbergs | G02B 6/3502 385/16 |
| 7,416,315 B2* | 8/2008 | Blumel | F21V 5/02 362/327 |
| 2002/0080485 A1* | 6/2002 | Suzuki | G02B 27/283 359/485.06 |
| 2009/0303480 A1* | 12/2009 | Tamada | G01J 3/0205 356/369 |
| 2011/0206320 A1* | 8/2011 | Kuo | G02B 27/126 385/32 |

FOREIGN PATENT DOCUMENTS

| | | |
|---|---|---|
| JP | 2000-241767 A | 9/2000 |
| JP | 2000-338328 A | 12/2000 |
| JP | 2002-182158 A | 6/2002 |
| JP | 2002-189301 A | 7/2002 |
| JP | 2009-300108 A | 12/2009 |
| JP | 4645173 B2 | 3/2011 |
| JP | 5071294 B2 | 11/2012 |
| JP | 5231538 B2 | 7/2013 |
| WO | WO-2012/132647 A1 | 10/2012 |

OTHER PUBLICATIONS

Born et al., "Principles of Optics," Electromagnetic Theory of Propagation, Interference and Diffraction of Light, 7th edition (expanded), Cambridge University Press, Jun. 20, 2005.

* cited by examiner

WAVE PLATE AND DIVIDED PRISM MEMBER

CROSS REFERENCE TO RELATED APPLICATIONS

This application is a divisional of U.S. patent application Ser. No. 14/906,924, filed Jan. 22, 2016, which is a National Stage Entry of International Application No. PCT/JP2014/063383, filed May 20, 2014, which claims the benefit of Japanese Patent Application No. 2013-158037, filed Jul. 30, 2013, the entire contents of each of which is incorporated herein by reference.

TECHNICAL FIELD

The present invention relates to a wave plate and a divided prism member.

BACKGROUND ART

A wave plate is known as an element for controlling polarization. For example, incident light having linearly polarized light can be changed to the light having linearly polarized light in any direction, by rotating the wave plate around the optical axis. Conventionally, a wave plate constituted by a medium having refractive index anisotropy has been generally used. When the refractive index anisotropy exists in the medium, a traveling speed of the light changes depending on the direction of the polarized light, therefore phase of the emitted light changes relative to phase of the incident light. An amount of change in phase at the time is in inverse proportional to a wavelength of the light.

On the other hand, as for the wave plate, there is a wave plate what is called Fresnel rhomb type utilizing the phase change associated with total reflection (for example, refer to Non Patent Literature 1). In the Fresnel rhomb type wave plate, light is incident on a surface of a prism, and after changing phase of the light by totally reflecting the light in the prism, the light is emitted out the prism.

CITATION LIST

Non Patent Literature

Non Patent Literature 1: Principles of Optics I (written by Max Born and Emil Wolf)

SUMMARY OF INVENTION

Technical Problem

However, in the wave plate using the refractive index anisotropy of the medium, there was a problem that a wavelength region capable of realizing desirable phase change was limited since the amount of change in phase is in inverse proportional to the wavelength of light. Therefore, for example, when using the wave plate for a terahertz wave having a wide wavelength region, sometimes wave plates respectively having different properties had to be prepared with respect to each wavelength.

On the other hand, in the conventional Fresnel rhomb type wave plate, there was a problem that when an entrance surface of the prism was enlarged to apply it to light having a large beam diameter, the size of the prism in the traveling direction of the light had to become large accordingly. Thus, sometimes it became cumbersome to handle the wave plate.

For solving the above-mentioned problem, it is an object of an aspect of the present invention to provide a wave plate and a divided prism member which can be applied over a wide wavelength region, and downsizing can be achieved even with respect to a large beam diameter.

Solution to Problem

A wave plate according to an aspect of the present invention includes: a prism member having an entrance surface for receiving a terahertz wave, and an exit surface for emitting the terahertz wave received by the entrance surface; wherein the prism member is constituted by a plurality of waveguide regions having: a partial entrance surface for receiving a part of the terahertz wave, a plurality of total reflection surfaces for totally reflecting the terahertz wave from the partial entrance surface, and a partial exit surface for emitting the terahertz wave totally reflected on the total reflection surfaces; and each of the partial entrance surfaces combine to constitute the entrance surface of the prism member, and each of the partial exit surfaces combine to constitute the exit surface of the prism member, by stacking the plurality of the waveguide regions.

In this wave plate, phase of the terahertz wave is changed through the use of total reflection. Therefore, since the amount of change in phase becomes independent from the wavelength of the terahertz wave, the amount of change in phase can be a desirable value with respect to the terahertz wave having a wide wavelength region. In addition, the prism member has a plurality of waveguide regions each having a partial entrance surface for receiving a part of the terahertz wave, a plurality of total reflection surfaces for totally reflecting the terahertz wave from the partial entrance surface, and a partial exit surface for emitting the terahertz wave totally reflected on the total reflection surfaces. In these waveguide regions, the size in the traveling direction of the terahertz wave can be suppressed from increasing. In this wave plate, since the prism member is constituted by stacking the waveguide regions in accordance with the beam diameter of the terahertz wave, the entrance surface and the exit surface can be set to any size, while keeping the size of the prism member in the traveling direction of the terahertz wave suppressed from increasing. Therefore, downsizing of the wave plate can be achieved even with respect to a large beam diameter.

A gap portion with a space larger than a leaking depth of the evanescent wave of the terahertz wave may be arranged between the total reflection surfaces in each of the adjacent waveguide regions. In this case, the respective terahertz waves guiding the wave through each of the waveguide regions can be prevented from interfering with each other, and a desirable phase change can be certainly achieved.

An inclination angle of each of the total reflection surfaces with respect to an optical axis of the terahertz wave may be set so that an incident axis of the terahertz wave incident on the partial entrance surface and an emission axis of the terahertz wave emitting from the partial exit surface substantially match, in each of the waveguide regions. In this case, since the traveling direction of the terahertz wave does not change when the wave plate is rotated to control polarization, adjustment of the optical system becomes easy.

Every inclination angle of each of the total reflection surfaces with respect to the optical axis of the terahertz wave may be equal, in each of the waveguide regions. In this case, designing and producing of the wave plate become easy, and a desirable amount of change in phase can be obtained with high accuracy.

The plurality of total reflection surfaces may be constituted by four surfaces, that is, a first total reflection surface, a second total reflection surface, a third total reflection surface and a fourth total reflection surface, in each of the waveguide regions. In this case, the respective inclination angles of the total reflection surfaces can be optimized.

The prism member may be provided with a holding surface substantially parallel to the incident axis and the emission axis of the terahertz wave, and for holding the wave plate in a holding member. In this case, the wave plate can be easily held in the holding member using the holding surface.

The wave plate may include a plurality of divided prism members having the waveguide regions; wherein the prism member may be constituted by stacking the plurality of divided prism members. In this case, since each of the waveguide regions can be easily designed and produced as the divided prism members, a desirable amount of change in phase can be obtained with high accuracy.

Each of the divided prism members may be provided with a contact surface substantially parallel to the incident axis and the emission axis of the terahertz wave, and for contacting the adjacent divided prism members in the stacking direction. In this case, the divided prism members can be suitably stacked and arranged by making the mutual contact surfaces of the adjacent divided prism members to be in abutting contact.

Further, a divided prism member according to an aspect of the present invention constitutes a prism member having an entrance surface for receiving a terahertz wave, and an exit surface for emitting the terahertz wave from the entrance surface, comprising: a waveguide region having a partial entrance surface for receiving a part of the terahertz wave, a plurality of total reflection surfaces for totally reflecting the terahertz wave entered from the partial entrance surface, and a partial exit surface for emitting the terahertz wave totally reflected on the total reflection surfaces.

The divided prism member is provided with the waveguide region having the partial entrance surface for receiving a part of the terahertz wave, the plurality of total reflection surfaces for totally reflecting the terahertz wave from the partial entrance surface, and the partial exit surface for emitting the terahertz wave totally reflected on the total reflection surfaces. In this divided prism member, the size in the traveling direction of the terahertz wave can be suppressed from increasing. By stacking the divided prism members in accordance with the beam diameter of the terahertz wave, the entrance surface and the exit surface of the wave plate can be set to any size, while keeping the size in the traveling direction of the terahertz wave suppressed from increasing. Consequently, downsizing of the wave plate can be achieved even with respect to a large beam diameter.

Advantageous Effects of Invention

According to an aspect the present invention, it can be applied over a wide wavelength region, and downsizing can be achieved even with respect to a large beam diameter.

DESCRIPTION OF EMBODIMENTS

In the following, preferred embodiments of the wave plate in accordance with the present invention will be explained in detail with reference to the drawings.

Figure 1:
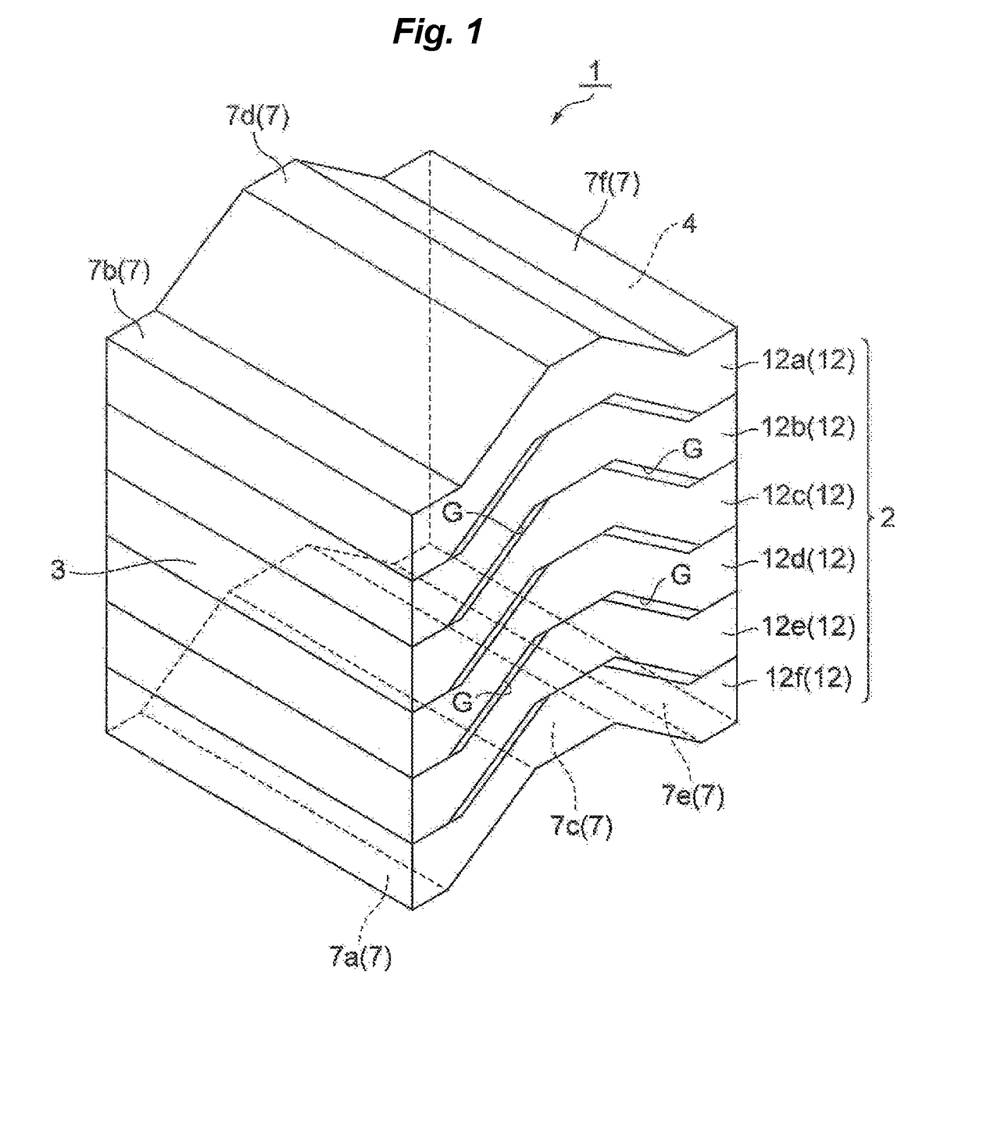
FIG. 1 is a perspective view illustrating an embodiment of a wave plate in accordance with the present invention.

FIG. 1 is a perspective view illustrating an embodiment of the wave plate in accordance with the present invention. The wave plate 1 illustrated in the drawing is provided with a prism member 2 for guiding a terahertz wave, and is constituted as an element to change a certain amount of polarization state of the incident terahertz wave. As for the terahertz wave, for example, a laser beam with a beam diameter of 30 mm can be envisaged. In this regard, the "terahertz wave" in the present invention means an electromagnetic wave with a frequency of 0.1 THz to 100 THz.

The prism member 2 has an entrance surface 3 for receiving a terahertz wave, and an exit surface 4 for emitting the terahertz wave received by the entrance surface 3, and a holding surface 7. The entrance surface 3 is a surface on which a terahertz wave T is entered into the prism member, and is disposed on one edge side of the prism member 2. The terahertz wave T is to be substantially perpendicularly incident on the entrance surface 3. The exit surface 4 is a surface from which the terahertz wave T is emitted, and is disposed on another edge side of the prism member 2. The terahertz wave T is to be emitted substantially perpendicularly from the exit surface 4 such that the incident axis of the terahertz wave T incident on the entrance surface 3 substantially coincides with the emission axis of the terahertz wave T emitting from the exit surface 4.

The holding surface 7 is a surface for the wave plate 1 to be held in a holding member such as a holder. In this embodiment, the holding surfaces 7 are constituted by a total of six surfaces, that is, a first holding surface 7a, a second holding surface 7b, a third holding surface 7c, a fourth holding surface 7d, a fifth holding surface 7e, and a sixth holding surface 7f.

Figure 2A:
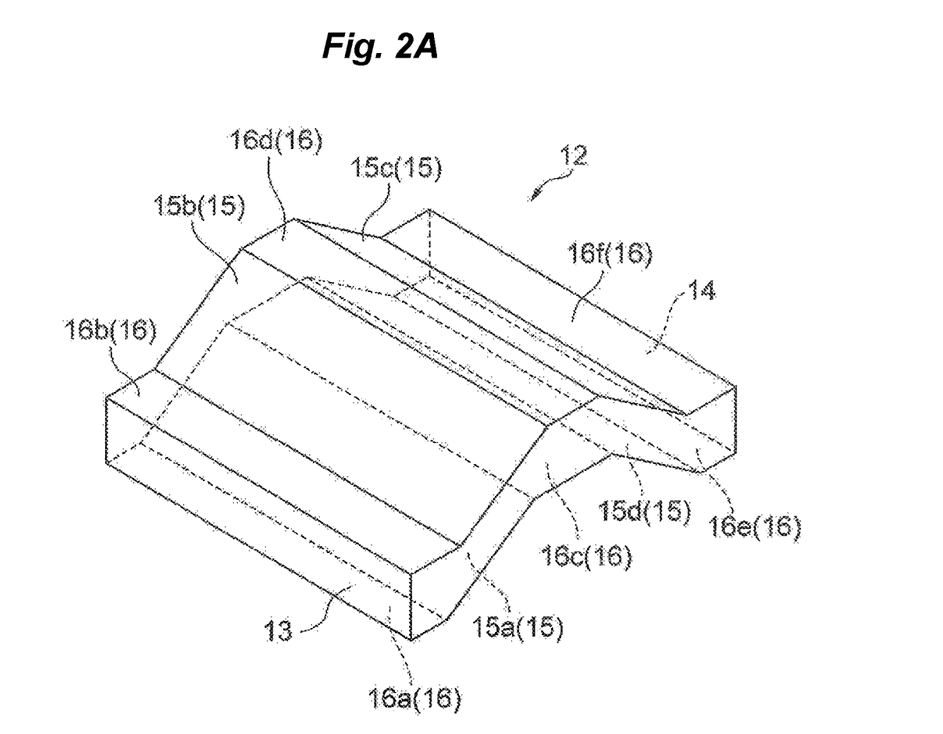
FIG. 2A is a perspective view illustrating a divided prism member constituting the wave plate illustrated in FIG. 1.
Figure 2B:
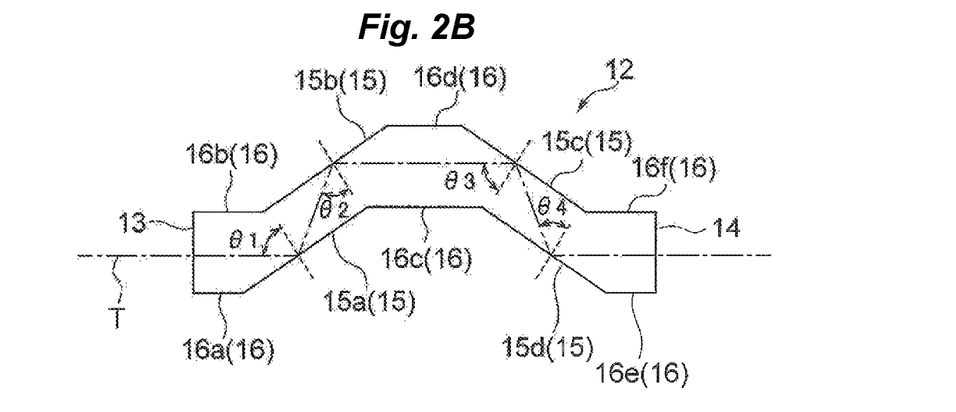
FIG. 2B is a side view of the divided prism member illustrated in FIG. 2A.

The prism member 2 is constituted by stacking divided prism members 12 (12a to 12f). FIG. 2A is a perspective view illustrating a divided prism member 12 constituting the prism member 2. And, FIG. 2B is a side view of FIG. 2A. In FIG. 2B, an optical axis of the terahertz wave T passing through the divided prism members 12 is illustrated in the chained line for descriptive purposes. The divided prism member 12 illustrated in FIG. 2A and FIG. 2B is formed in a rectangular cross section, made of, for example, cycloolefin polymer having a refractive index of 1.5, and has a waveguide region for guiding a part of the terahertz wave T passing through the prism member 2. The waveguide region is constituted by, for example, a partial entrance surface 13, a total reflection surface 15, a partial exit surface 14, and an contact surface 16.

The partial entrance surface 13 is a surface on which a terahertz wave T is entered into the prism member 12, and is disposed on one edge side of the prism member 12. On the partial entrance surface 13, a part of the terahertz wave T is to be substantially perpendicularly incident.

The total reflection surface 15 is a surface on which a part of the terahertz wave T incident on the partial entrance surface 13 is totally reflected, thereby changing phase of the terahertz wave T. In this embodiment, the total reflection surfaces 15 are constituted by a total of four surfaces, that is, a first total reflection surface 15a, a second total reflection surface 15b, a third total reflection surface 15c, and a fourth total reflection surface 15d. The first total reflection surface 15a is disposed on the partial entrance surface 13 side and is located at the bottom surface of the divided prism member 12; and the second total reflection surface 15b is disposed on the partial entrance surface 13 side and is located at the top surface of the divided prism member 12 so as to be opposite to the first total reflection surface 15a. The third total reflection surface 15c is disposed on the partial exit surface 14 side and is located at the top surface of the divided prism member 12; and the fourth total reflection surface 15d is disposed on the partial exit surface 14 side and is located at the bottom surface of the divided prism member 12 so as to be opposite to the third total reflection surface 15c.

In this embodiment, the inclination angles θ1 to θ4 between the optical axis of a part of the terahertz wave T and the respective normal directions of the first total reflection surface 15a to the fourth total reflection surface 15d are all, for example, 55° respectively. A part of the terahertz wave T incident on the partial entrance surface 13 is totally reflected in order from the first total reflection surface 15a, the second total reflection surface 15b, the third total reflection surface 15c, to the fourth total reflection surface 15d, and then is guided to the partial exit surface 14, as illustrated in FIG. 2B.

The partial exit surface 14 is a surface from which a part of the terahertz wave T which was totally reflected by the total reflection surfaces 15a to 15d is emitted, and is disposed on another edge side of the divided prism members 12. The part of the terahertz wave T is to be emitted substantially perpendicularly from the partial exit surface 14 such that the incident axis of the part of the terahertz wave T incident on the partial entrance surface 13 substantially coincides with the emission axis of the part of the terahertz wave T emitting from the partial exit surface 14.

An contact surface 16 is a surface which is in contact with the adjacent divided prism members in the stacking direction when constituting the prism member 2 by stacking the divided prism members 12. In this embodiment, the contact surfaces 16 are constituted by a total of six surfaces, that is, a first contact surface 16a, a second contact surface 16b, a third contact surface 16c, a fourth contact surface 16d, a fifth contact surface 16e, and a sixth contact surface 16f. The first contact surface 16a is disposed between the partial entrance surface 13 and the first total reflection surface 15a and is located at the bottom surface of the divided prism member 12; and the second contact surface 16b is disposed between the partial entrance surface 13 and the second total reflection surface 15b and is located at the top surface of the divided prism member 12 so as to be opposite to the first contact surface 16a.

The third contact surface 16c is disposed between the first total reflection surface 15a and the fourth total reflection surface 15d and is located at the bottom surface of the divided prism member 12; and the fourth contact surface 16d is disposed between the second total reflection surface 15b and the third total reflection surface 15c and is located at the top surface of the divided prism member 12 so as to be opposite to the third contact surface 16c. Also, the fifth contact surface 16e is disposed between the fourth total reflection surface 15d and the partial exit surface 14 and is located at the bottom surface of the divided prism member 12; and the sixth contact surface 16f is disposed between the third total reflection surface 15c and the partial exit surface 14 and is located at the top surface of the divided prism member 12 so as to be opposite to the fifth contact surface 16e. The first contact surface 16a to the sixth contact surface 16f are all provided flatly and substantially in parallel to the incident axis and the emission axis of the terahertz wave T.

In the divided prism members 12 mentioned above, an amount of change in phase δ of the terahertz wave T by the total reflection on the total reflection surface 15 is as the expression (1).

[Math. 1]

$$\tan\frac{\delta}{2} = -\frac{\cos\theta\sqrt{\sin^2\theta - n^2}}{\sin^2\theta} \quad (1)$$

Where, in the expression (1), n represents a ratio ($N_{out}$/N) between a refractive index N of the divided prism members 12 and a refractive index $N_{out}$ of the medium outside the divided prism members 12, and θ represents an inclination angle between the optical axis of the terahertz wave and the normal direction of the total reflection surface.

As is obvious from the expression (1), the amount of change in phase δ of the terahertz wave T by the total reflection is independent of the wavelength of the terahertz wave T, but is dependent on the inclination angle θ of the total reflection surface 15. Therefore, a total of the amount of change in phase of the terahertz wave T by the total reflection on each of the total reflection surfaces 15a, 15b, 15c, 15d can achieve a desirable value, by suitably setting the inclination angle θ of each of the total reflection surfaces 15a, 15b, 15c, 15d. Thus, according to the divided prism members 12, a desirable amount of change in phase can be realized in every wavelength region even the terahertz wave T has a wide wavelength region. Additionally, in the divided prism members 12, since only the total reflection is utilized without using reflection by a metal and the like, a loss in the terahertz wave T can be suppressed.

In the divided prism members 12, since the inclination angle θ is 55°, the amount of change in phase δ can be obtained as 45° from the expression (1). Accordingly, the sum of each amount of change in phase of the terahertz wave T by the total reflection on the respective total reflection surfaces 15a, 15b, 15c, 15d becomes 45°×4=180°, that is ½ wavelength.

Figure 3:
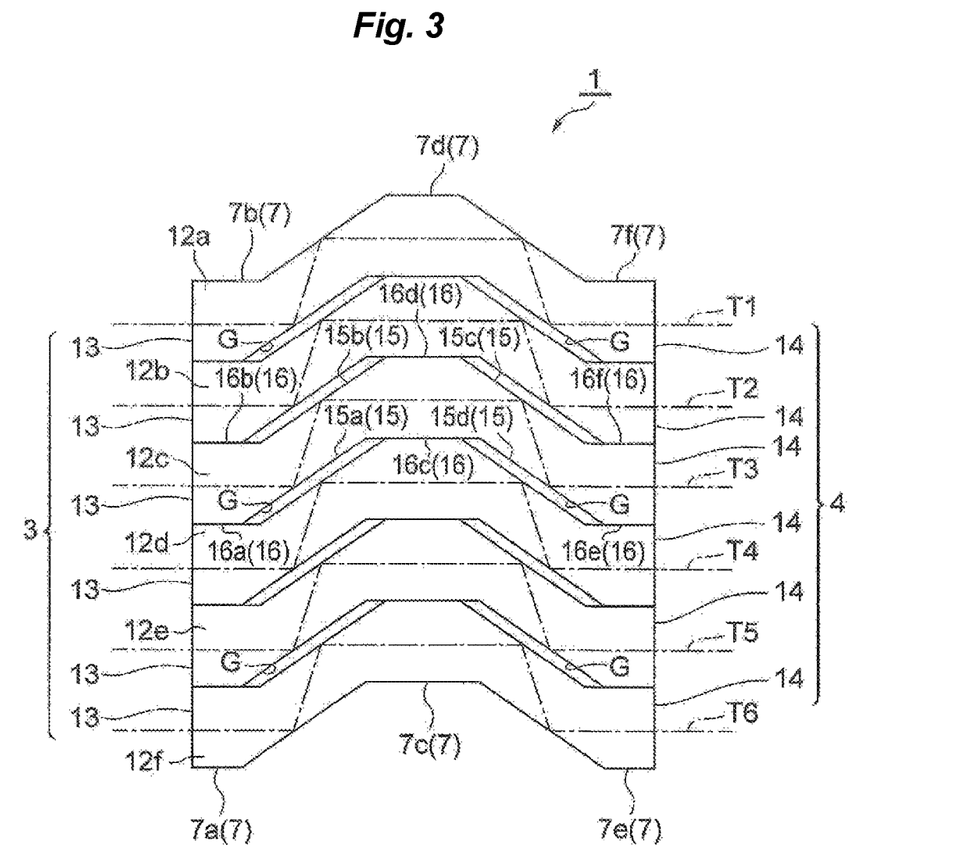
FIG. 3 is a side view of the divided prism members illustrated in
FIG. 1.

FIG. 3 is a side view of the wave plate 1 illustrated in FIG. 1. In this embodiment, the prism member 2 is constituted by stacking so that the contact surfaces 16 of the divided prism members 12, in which six divided prism members 12a to 12f are adjacent thereto, are to be in abutting contact with one another.

By stacking the divided prism members 12, the entrance surface 3 of the prism member 2 is successively constituted by the partial entrance surfaces 13a to 13f of the respective divided prism members 12; and the exit surface 4 is successively constituted by the partial exit surfaces 14a to 14f of the respective divided prism members 12. In addition, the total reflection surfaces 15 are constituted by a total of twenty-four surfaces, that is, the total reflection surfaces 15a to 15d of the respective divided prism members 12a to 12f.

Further, a first holding surface 7a, a third holding surface 7c, and a sixth holding surface 7f of the prism member 2 are constituted by the first contact surface 16a, the third contact surface 16c, and the sixth contact surface 16f of the divided prism member 12f arranged at the lowest part, respectively. While, a second holding surface 7b, a fourth holding surface 7d, and a fifth holding surface 7e of the prism member 2 are constituted by the second contact surface 16b, the fourth contact surface 16d, and the fifth contact surface 16e of the divided prism member 12a arranged at the top part, respectively.

Due to such a structure of the prism member 2, parts T1 to T6 of the terahertz wave T incident on the entrance surface 3 are respectively incident on the partial entrance surfaces 13 of the respective divided prism members 12a to 12f, and are totally reflected in order from the first total reflection surface 15a to the fourth total reflection surface 15d of the respective divided prism members 12a to 12f, and then the parts T1 to T6 of the terahertz wave T get together at the partial exit surfaces 14 of the respective divided prism members 12a to 12f to emit from the exit surface 4.

Figure 4:
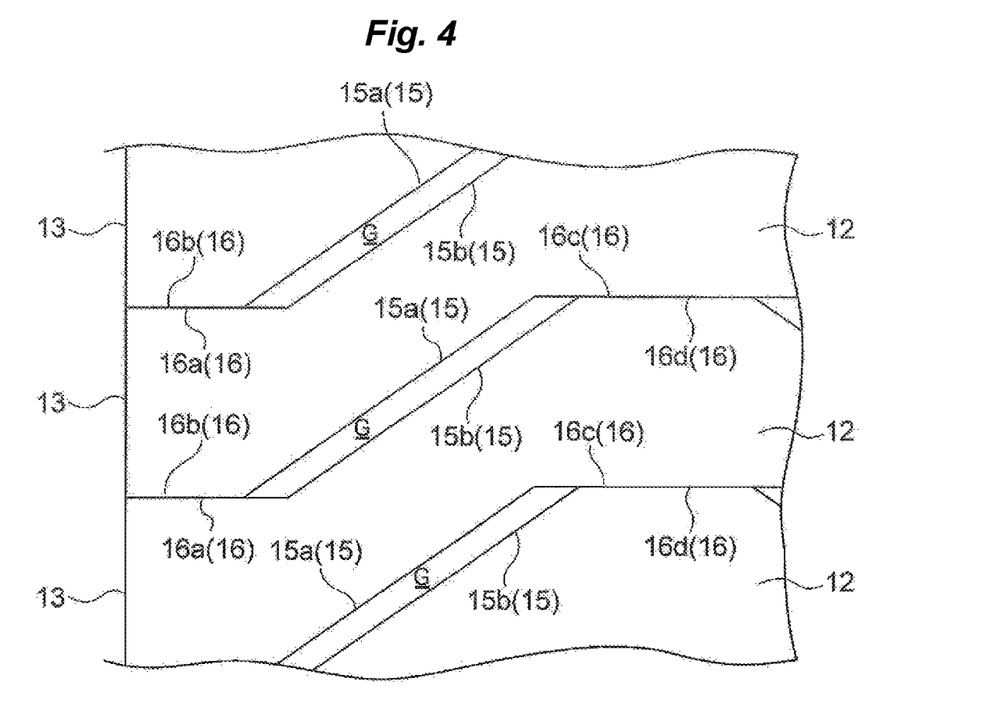
FIG. 4 is a partially enlarged view of the divided prism members illustrated in FIG. 1.

FIG. 4 is a partially enlarged view of FIG. 3. In this embodiment, a gap portion G is formed between the second total reflection surface 15b of one divided prism member 12 and the first total reflection surface 15a of the adjacent divided prism member 12. A space of the gap portion G (distance between the total reflection surface 15a and the total reflection surface 15b) is, for example, at least the same or more of the leaking depth $d_p$ of an evanescent wave at the total reflection surfaces 15a, 15b of the terahertz wave. The space of the gap portion G is preferably twice or more of the leaking depth $d_p$, more preferably three times or more of the leaking depth $d_p$, and still more preferably six times or more of the leaking depth $d_p$. In this regard, the leaking depth $d_p$ is as the expression (2).

[Math. 2]

$$d_p = \frac{\lambda}{2\pi(\sin^2\theta - n^2)^{1/2}} \quad (2)$$

Where, in the expression (2), n represents a ratio ($N_G/N$) between a refractive index N of the divided prism members 12 and a refractive index $N_G$ of the medium constituting the gap portion G, and θ represents an inclination angle between the optical axis of the terahertz wave and the normal direction of the total reflection surface 15. Similarly, the gap portion G is also formed between the fourth total reflection surface 15d of one divided prism member 12 and the third total reflection surface 15c of the adjacent divided prism member 12.

Additionally, in this embodiment, as illustrated in FIG. 4, the third contact surface 16c of the divided prism member 12 is disposed above the second contact surface 16b and the fifth contact surface 16e (on the fourth contact surface 16d side).

Hereinafter, effects of the above-mentioned wave plate 1 will be explained. In the wave plate 1, the prism member 2 is constituted by stacking the divided prism members 12a to 12f. And, the partial entrance surfaces 13a to 13f of the divided prism members 12a to 12f combine to constitute the entrance surface 3 of the prism member 2, and the partial exit surfaces 14a to 14f of the divided prism members 12a to 12f combine to constitute the exit surface 4 of the prism member 2. Therefore, the entrance surface can be enlarged in accordance with the beam diameter of the terahertz wave T, while keeping the size of each of the waveguide regions in the traveling direction of the terahertz wave T suppressed from increasing. Therefore, downsizing of the wave plate can be achieved even with respect to a large beam diameter.

Figure 5A:
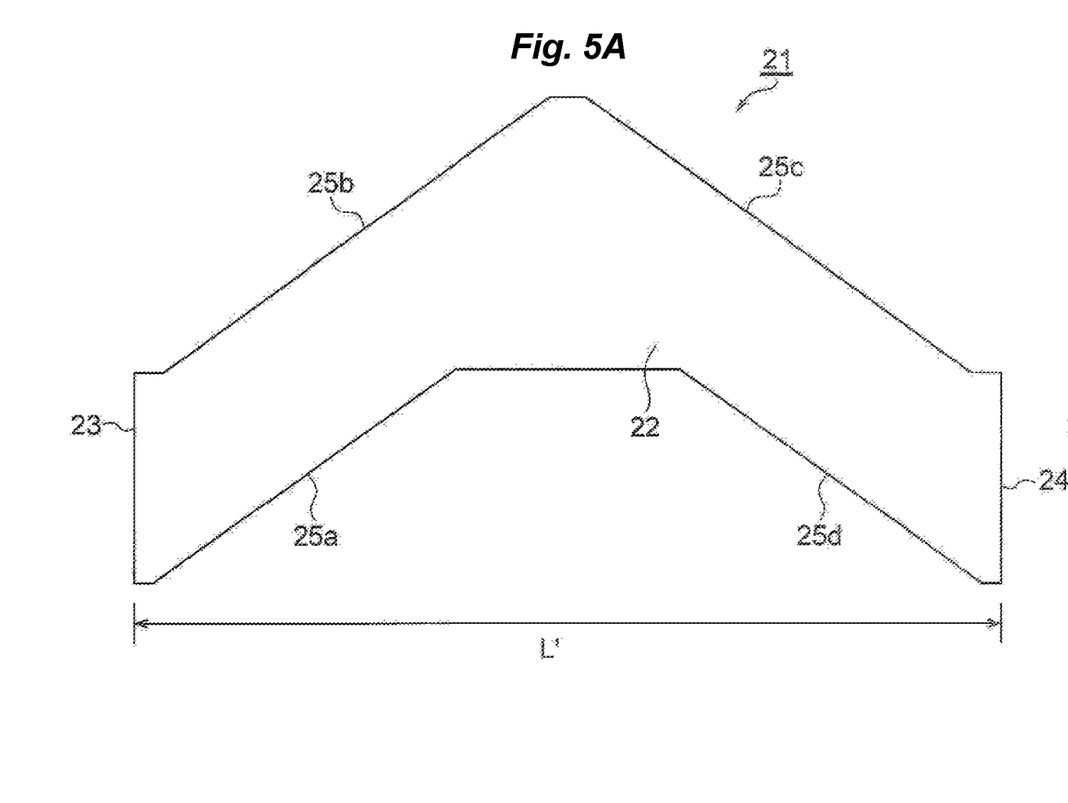
FIGS. 5A and 5B illustrate side views of a wave plate in accordance with a working example and a wave plate in accordance with a comparative example, in comparison to each other.

Here, when producing a ½ wave plate, for example, as illustrated in FIG. 5A, a case of constituting a ½ wave plate 21 with a prism member having an entrance surface 23 with the same size as the entrance surface 3, and being provided with only a single waveguide region, is considered.

The wave plate 21 in the comparative example illustrated in FIG. 5A includes a prism member 22 having the entrance surface 23, an exit surface 24, a first total reflection surface 25a, a second total reflection surface 25b, a third total reflection surface 25c, and a fourth total reflection surface 25d. In this wave plate 21, when making the entrance surface 23 and the exit surface 24 responsive to the terahertz wave T having a diameter of 30 mm, the length L' of the prism member 22 in the traveling direction of the terahertz wave T becomes, for example, 122 mm.

Figure 5B:
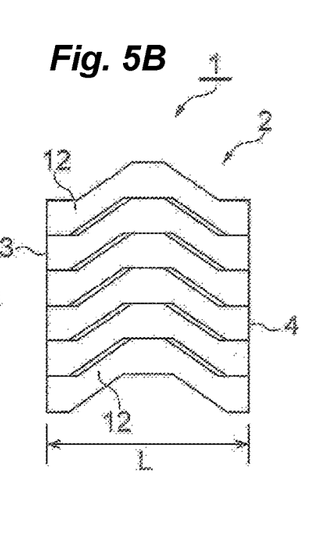

On the other hand, in the wave plate 1 in the working example illustrated in FIG. 5B, the length L of the divided prism members 12 in the traveling direction of the terahertz wave T becomes, for example, 29 mm. In this wave plate 1, the size of the prism member 2 in the traveling direction of the terahertz wave T can be maintained as the size of the divided prism members 12 even when stacking the divided prism members 12, and making the entrance surface 3 and the exit surface 4 responsive to the terahertz wave T having a diameter of 30 mm Therefore, downsizing of the wave plate 1 can be achieved even with respect to a large beam diameter.

In addition, each of the divided prism members 12a to 12f can realize a desirable amount of change in phase over the whole wavelength region even the terahertz wave T has a wide wavelength region. Therefore, similarly, also the wave plate 1 can realize a desirable amount of change in phase over the whole wavelength region even the terahertz wave T has a wide wavelength region.

Further, in the wave plate 1, the gap portion G with a space larger than the leaking depth of the evanescent wave on the total reflection surface 15 of the terahertz wave T is arranged between the total reflection surfaces 15 of the adjacent divided prism members 12. Therefore, the evanescent waves on the total reflection surfaces 15 of the terahertz wave T passing through the adjacent divided prism members 12 can be prevented from interfering with each other. Therefore, the amount of change in phase of the terahertz wave T can be a desirable value without being affected by the mutual interference between the evanescent waves.

Moreover, in the wave plate 1, the third contact surface 16c of the divided prism member 12 is disposed above the second contact surface 16b and the fifth contact surface 16e (on the fourth contact surface 16d side). Due to such a structure, the terahertz wave T incident around a boundary surface between the divided prism members 12, 12 can be guided onto the total reflection surface 15 without having a loss. Accordingly, occurrence of a loss of light by the wave plate 1 can be reduced.

Furthermore, the divided prism members 12a to 12f are constituted so that a part of the incident axis and a part of the emission axis of the terahertz wave T substantially match. Therefore, as illustrated in FIG. 3, when the divided prism members 12a to 12f are stacked, the incident axis and the emission axis of the terahertz wave T in the prism member 2 can be made substantially matched.

Figure 6:
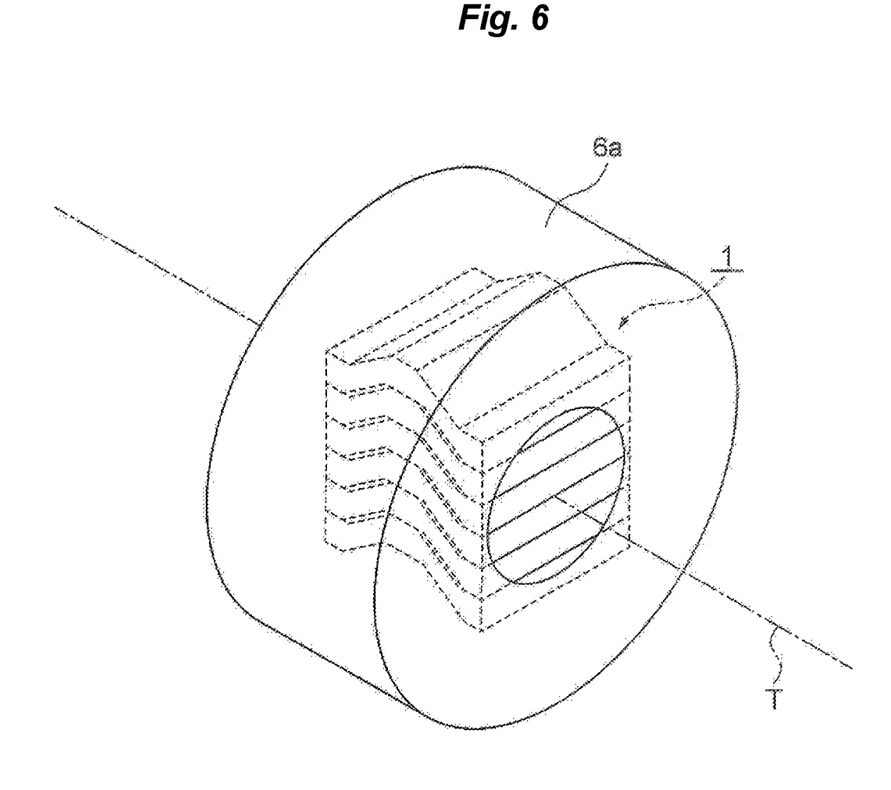
FIG. 6 is a perspective view illustrating an example where the wave plate illustrated in FIG. 1 is applied in a holder.
Figure 7:
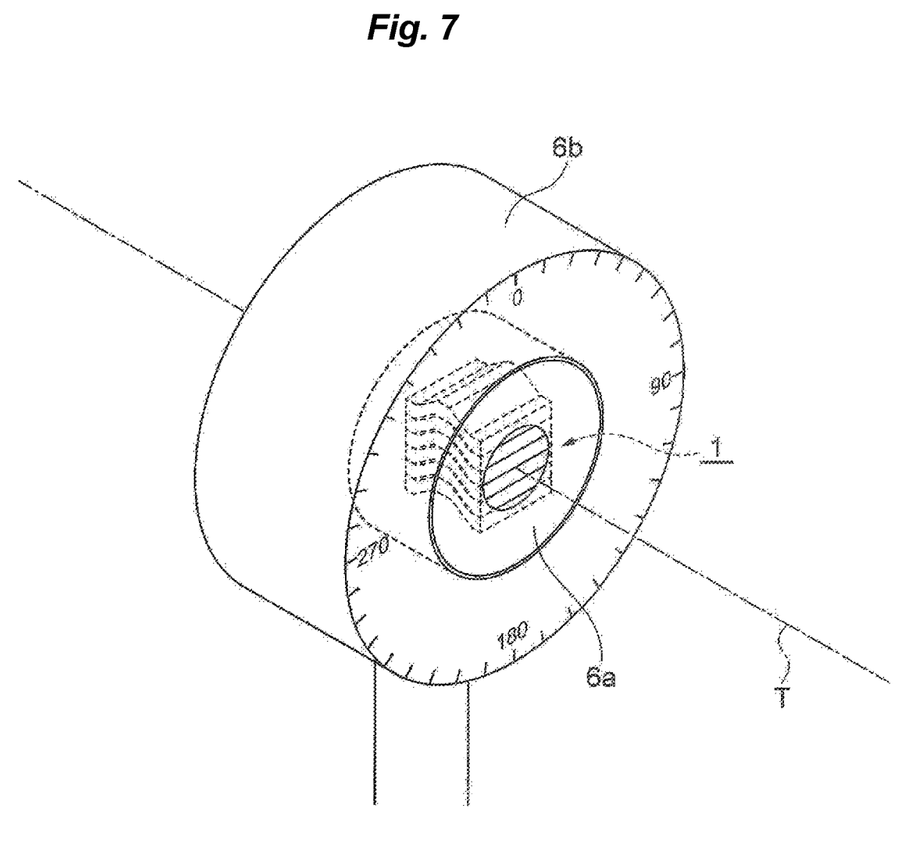
FIG. 7 is a perspective view illustrating an example where the wave plate and the holder illustrated in FIG. 6 are applied in a rotating holder.

When using the wave plate 1 in an optical system, for example, the wave plate 1 held in a holder 6a (see FIG. 6), can be mounted in a rotating holder 6b, as illustrated in FIG. 7. In the wave plate 1, since the incident axis and the emission axis of the terahertz wave T in the prism member 2 substantially coincide, by rotating the rotating holder 6b around the incident axis and the emission axis, the optical system can be easily adjusted without generating deviation in the incident axis and the emission axis of the terahertz wave T.

Still further, the wave plate 1 is provided with the prism member 2 having the holding surfaces 7 which are flat surfaces parallel to the incident axis and the emission axis of the terahertz wave T. Therefore, as illustrated in FIG. 6, the wave plate 1 can be easily held in the holder 6a by the flat holding surfaces 7.

Figure 8:
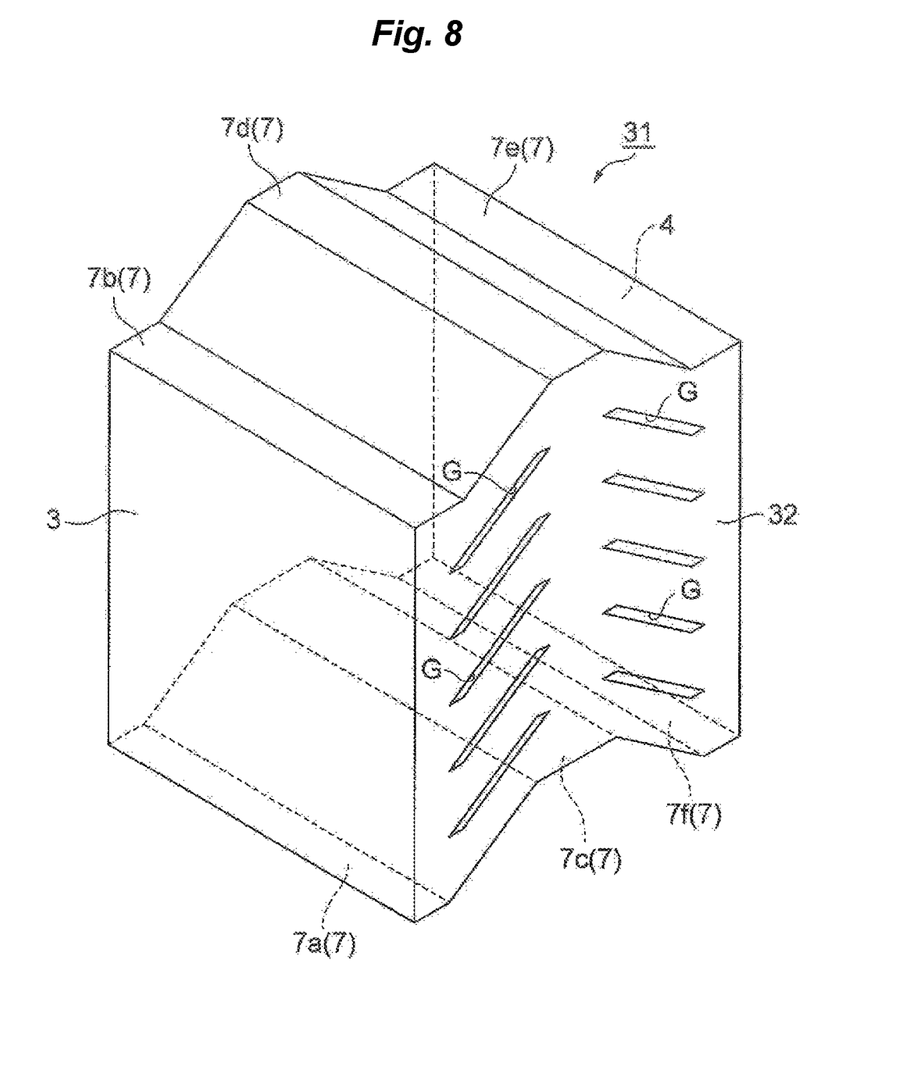
FIG. 8 is a perspective view illustrating a wave plate in accordance with a modified example.
Figure 9:
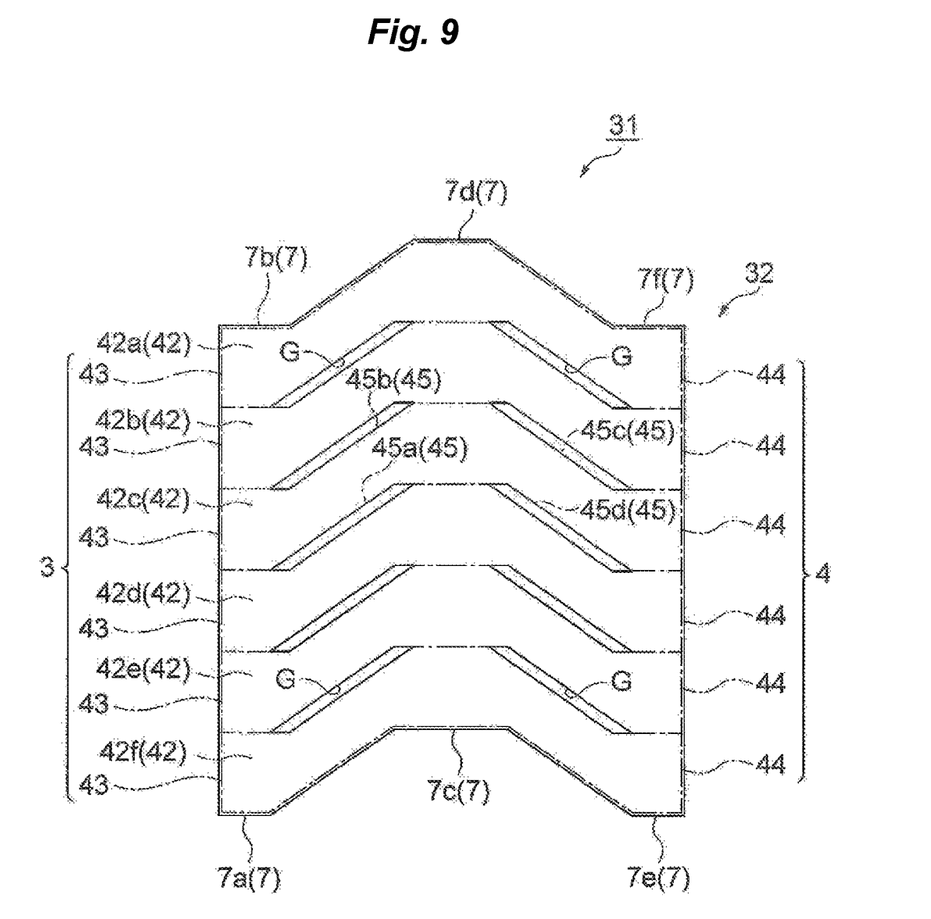
FIG. 9 is a side view of the wave plate illustrated in FIG. 8.

FIG. 8 is a perspective view illustrating a wave plate in accordance with a modified example. And, FIG. 9 is a side view of the wave plate of FIG. 8. As illustrated in FIG. 8 and FIG. 9, a wave plate 31 in accordance with the modified example is different from that of the first embodiment in the point that the wave plate 31 is constituted by a prism member 32 which is integrally formed without using the divided prism members 12.

In this wave plate 31, waveguide regions 42 (42a to 42f) having partial entrance surfaces 43, partial exit surfaces 44, and total reflection surfaces 45 (45a to 45d), which are similar to the divided prism members 12, are stacked and arranged in the prism member 32; and due to the stacking of each of the waveguide regions 42, each of the partial entrance surfaces 43 successively constitutes the entrance surface 3 of the prism member 32; and each of the partial exit surfaces 44 successively constitutes the exit surface 4 of the prism member 32. Such a wave plate 31 also yields advantageous effects similar to those in the above-mentioned embodiment. In this regard, the prism member 32 may be formed by cutting out from a bulk type material, or may be formed by stacking and fusing the divided prism members 12.

REFERENCE SIGNS LIST 1, 31 . . . wave plate; 2, 32 . . . prism member; 3 . . . entrance surface; 4 . . . exit surface; 7 . . . holding surface; 12 . . . divided prism member; 13 . . . partial entrance surface; 14 . . . partial exit surface; 15 . . . total reflection surface; 16 . . . contact surface; G . . . gap portion; T . . . terahertz wave; θ . . . inclination angle.

The invention claimed is:

1. A divided prism member constituting a prism member having an entrance surface for receiving a terahertz wave, and an exit surface for emitting the terahertz wave from the entrance surface, comprising:
   a waveguide region having a partial entrance surface for receiving a part of the terahertz wave, a plurality of total reflection surfaces for totally reflecting the terahertz wave entered from the partial entrance surface, and a partial exit surface for emitting the terahertz wave totally reflected on the total reflection surfaces; wherein
   the waveguide has a pair of contact surfaces;
   the pair of contact surfaces is in contact with the adjacent divided prism members in the stacking direction and next to the partial entrance surface when constituting the prism member by stacking a plurality of the divided prism members;
   the pair of contact surfaces is substantially parallel to the incident axis of the terahertz wave incident on the partial entrance surface and opposed to each other in a direction orthogonal to the incident axis; and
   a length of the pair of contact surfaces in a direction along the incident axis is different from each other.

2. A divided prism member constituting a prism member having an entrance surface for receiving a terahertz wave, and an exit surface for emitting the terahertz wave from the entrance surface, comprising:
   a waveguide region having a partial entrance surface for receiving a part of the terahertz wave, a plurality of total reflection surfaces for totally reflecting the terahertz wave entered from the partial entrance surface, and a partial exit surface for emitting the terahertz wave totally reflected on the total reflection surfaces; wherein
   the waveguide has a pair of contact surfaces;
   the pair of contact surfaces is in contact with the adjacent divided prism members in the stacking direction and next to the partial exit surface when constituting the prism member by stacking a plurality of the divided prism members;
   the pair of contact surfaces is substantially parallel to the emission axis of the terahertz wave emitting from the partial exit surface and opposed to each other in a direction orthogonal to the emission axis; and
   a length of the pair of contact surfaces in a direction along the emission axis is different from each other.

* * * * *